(12) United States Patent
Henige et al.

(10) Patent No.: US 9,970,623 B2
(45) Date of Patent: May 15, 2018

(54) VEHICULAR SIGNAL AND DAYTIME RUNNING LIGHT ASSEMBLIES WITH UNIFORM ILLUMINATION

(71) Applicant: Ford Global Technologies, LLC, Dearborn, MI (US)

(72) Inventors: Gary Edward Henige, Northville, MI (US); Chad Clement, Belleville, MI (US); Udayakumar Ramasami, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days. days.

(21) Appl. No.: 15/708,483

(22) Filed: Sep. 19, 2017

(65) Prior Publication Data

US 2018/0003358 A1 Jan. 4, 2018

Related U.S. Application Data

(63) Continuation of application No. 14/940,994, filed on Nov. 13, 2015, now Pat. No. 9,810,394.

(51) Int. Cl.
*F21S 8/10* (2006.01)
*G02B 3/08* (2006.01)
*F21Y 101/00* (2016.01)

(52) U.S. Cl.
CPC ......... *F21S 48/2212* (2013.01); *F21S 48/215* (2013.01); *G02B 3/08* (2013.01); *F21Y 2101/00* (2013.01)

(58) Field of Classification Search
CPC ...... G02B 3/08; F21S 48/2212; F21S 48/215; F21V 2101/02

USPC ....... 362/520, 521, 522, 523, 524, 525, 540, 362/541, 498, 499, 244, 245, 246, 308, 362/309, 311.01, 311.02, 311.06, 326, 362/330, 331
See application file for complete search history.

(56) References Cited

U.S. PATENT DOCUMENTS

| | | | |
|---|---|---|---|
| 4,864,473 A | 9/1989 | Tokarz et al. |
| 4,928,212 A | 5/1990 | Benavides |
| 4,959,757 A | 9/1990 | Nakata |
| 5,945,916 A | 8/1999 | Collot |
| 6,340,239 B1 | 1/2002 | Godbillon et al. |
| 6,926,972 B2 | 8/2005 | Jakobi et al. |
| 7,658,866 B2 | 2/2010 | Murazaki et al. |
| 8,545,723 B2 | 10/2013 | Comanzo et al. |
| 2002/0105801 A1 | 8/2002 | Martineau |
| 2005/0138852 A1 | 6/2005 | Yamauchi |
| 2005/0190570 A1 | 9/2005 | Roessler |
| 2006/0232976 A1 | 10/2006 | Lin et al. |
| 2007/0030688 A1 | 2/2007 | Amano et al. |
| 2007/0091613 A1 | 4/2007 | Lee et al. |

(Continued)

*Primary Examiner* — Laura Tso
(74) *Attorney, Agent, or Firm* — Jason Rogers; Price Heneveld LLP

(57) ABSTRACT

A vehicular signal assembly that includes an inner chamber defined by a substrate comprising LED light sources and spaced apart, corresponding Fresnel lenses; and an outer chamber defined by the Fresnel lenses and an outer lens comprising optical elements. The outer lens can have a width of at least 12 mm. Further, each LED source emanates incident light directly through the chambers to produce a light pattern with a contrast ratio of 3:1 or less, e.g., a daytime running light pattern. Each LED source can also emanate incident light directly through the corresponding Fresnel lens an outer lens to produce the daytime running light pattern.

17 Claims, 5 Drawing Sheets

(56) References Cited

U.S. PATENT DOCUMENTS

2013/0265791 A1 10/2013 Dassanayake et al.
2015/0124315 A1 5/2015 Sasahara

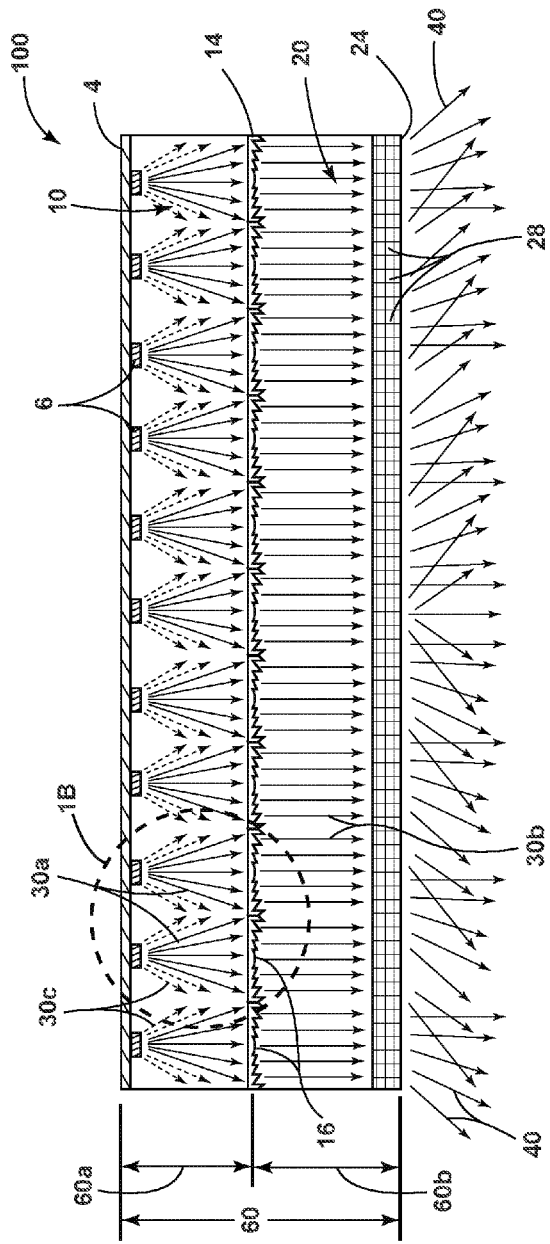
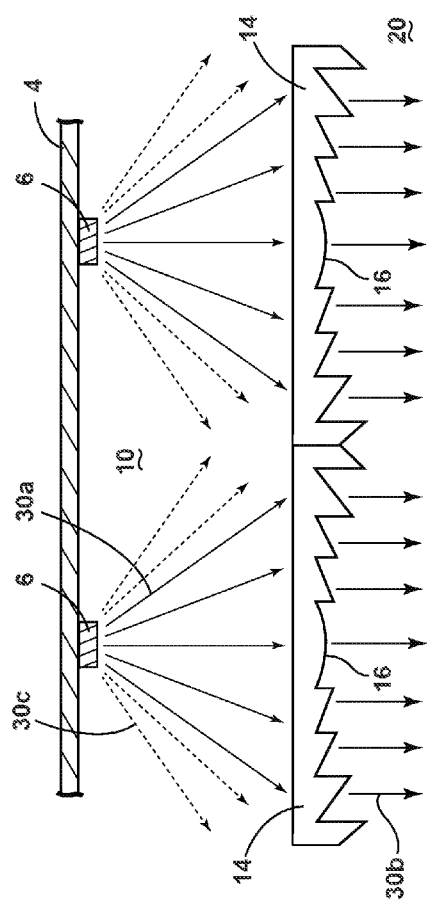
FIG. 1A
FIG. 1B

VEHICULAR SIGNAL AND DAYTIME RUNNING LIGHT ASSEMBLIES WITH UNIFORM ILLUMINATION

CROSS REFERENCE TO RELATED APPLICATIONS

This application is a continuation application that claims priority to and the benefit under 35 U.S.C. § 120 of U.S. patent application Ser. No. 14/940,994 filed on Nov. 13, 2015, entitled "VEHICULAR SIGNAL AND DAYTIME RUNNING LIGHT ASSEMBLIES WITH UNIFORM ILLUMINATION," now issued as U.S. Pat. No. 9,810,394 on Nov. 7, 2017, the entire disclosure of which is incorporated by reference herein.

FIELD OF THE INVENTION

The present invention generally relates to vehicular signal assemblies, particularly daytime running lamps, which can provide uniform illumination with a crystal appearance under ambient lighting when not in an illuminated state.

BACKGROUND OF THE INVENTION

Various LED signal assemblies are employed today with great practical effect. In the automotive industry, many vehicles utilize LED-based lighting assemblies, taking advantage of their much lower energy usage as compared to other light sources, including halogen- and incandescent-based systems. One problem associated with LEDs is that they tend to produce highly directional light. The light emanating from conventional LED-based vehicular lighting assemblies often has low uniformity and hot spots. Consequently, conventional LED-based lighting assemblies have a significant drawback when used in vehicle applications requiring high uniformity—i.e., signal lamps.

Certain vehicular signal applications, e.g., daytime running lights (DRLs), require high intensity with high uniformity. Conventional approaches for achieving high uniformity with LED sources have employed specular and non-specular reflector elements, coatings and layers within the assemblies. While these approaches can improve uniformity, they often lead to significant light loss through scattering and other loss mechanisms that lead to a loss in light intensity.

In contrast, other conventional LED-based approaches can, in certain cases, achieve high intensity through minimal or no use of reflecting elements. As LEDs produce highly directional light patterns, these conventional approaches generally result in assemblies that suffer from a "spotty" appearance. Other conventional LED-based lighting approaches have resulted in some assemblies that can produce lighting patterns with moderate intensity and uniformity, but only in assemblies with linear shapes and small widths (e.g., <12 mm).

Accordingly, there is a need for LED-based vehicular signal assemblies that exhibit a high degree of light uniformity, light intensity and design flexibility.

SUMMARY OF THE INVENTION

One aspect of the present invention is to provide a vehicular signal assembly that includes an inner chamber defined by a substrate and spaced apart, corresponding Fresnel lenses; and an outer chamber defined by the lenses and an outer lens. Further, the chambers are non-linearly shaped, and the substrate comprises a plurality of LED sources emanating light through the chambers into a light pattern with a contrast ratio of 3:1 or less.

Another aspect of the present invention is to provide a vehicular signal assembly that includes an inner chamber defined by a substrate and spaced apart, corresponding Fresnel lenses; and an outer chamber defined by the lenses and an outer lens. Further, the chambers have a substantially open construction, and the substrate comprises a plurality of LED sources emanating light through the chambers into a light pattern, each LED source emanating light through the corresponding lens and at least one adjacent lens.

A further aspect of the present invention is to provide a vehicular signal assembly that includes an inner chamber defined by a substrate and spaced apart, corresponding Fresnel lenses; and an outer chamber defined by the lenses and an outer lens. The chambers are non-linearly shaped and have a substantially open construction. Further, the substrate comprises a plurality of LED sources emanating light through the chambers into a light pattern, each LED source emanating light through the corresponding lens and at least one adjacent lens.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 1A is a top-down, cross-sectional view of the signal assembly depicted in FIG. 1;

FIG. 1B is an enlarged view of Fresnel lenses in the signal assembly depicted in FIG. 1A;

DETAILED DESCRIPTION OF THE PREFERRED EMBODIMENTS

Figure 1:
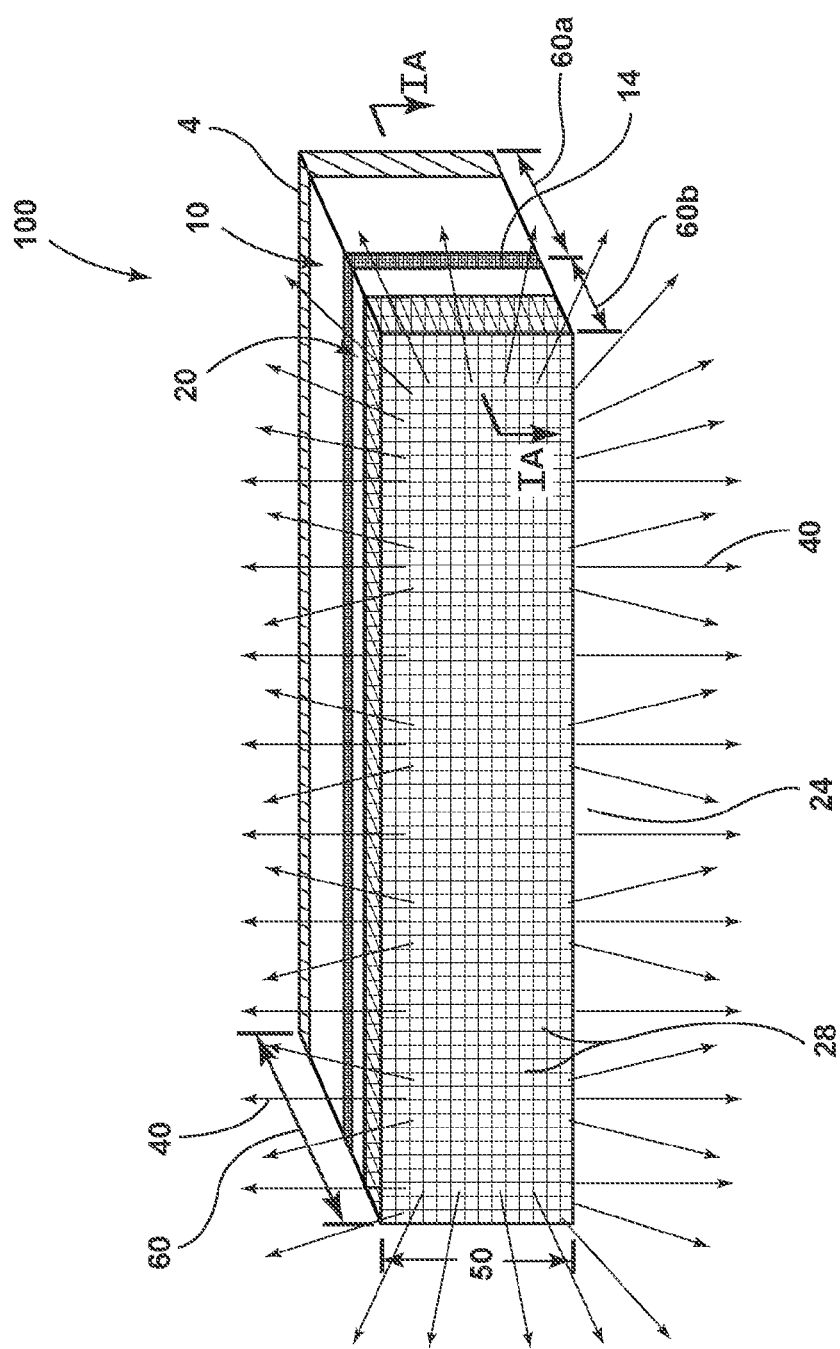
FIG. 1 is an end-on, perspective view of a signal assembly according to an embodiment.
Figure 2:
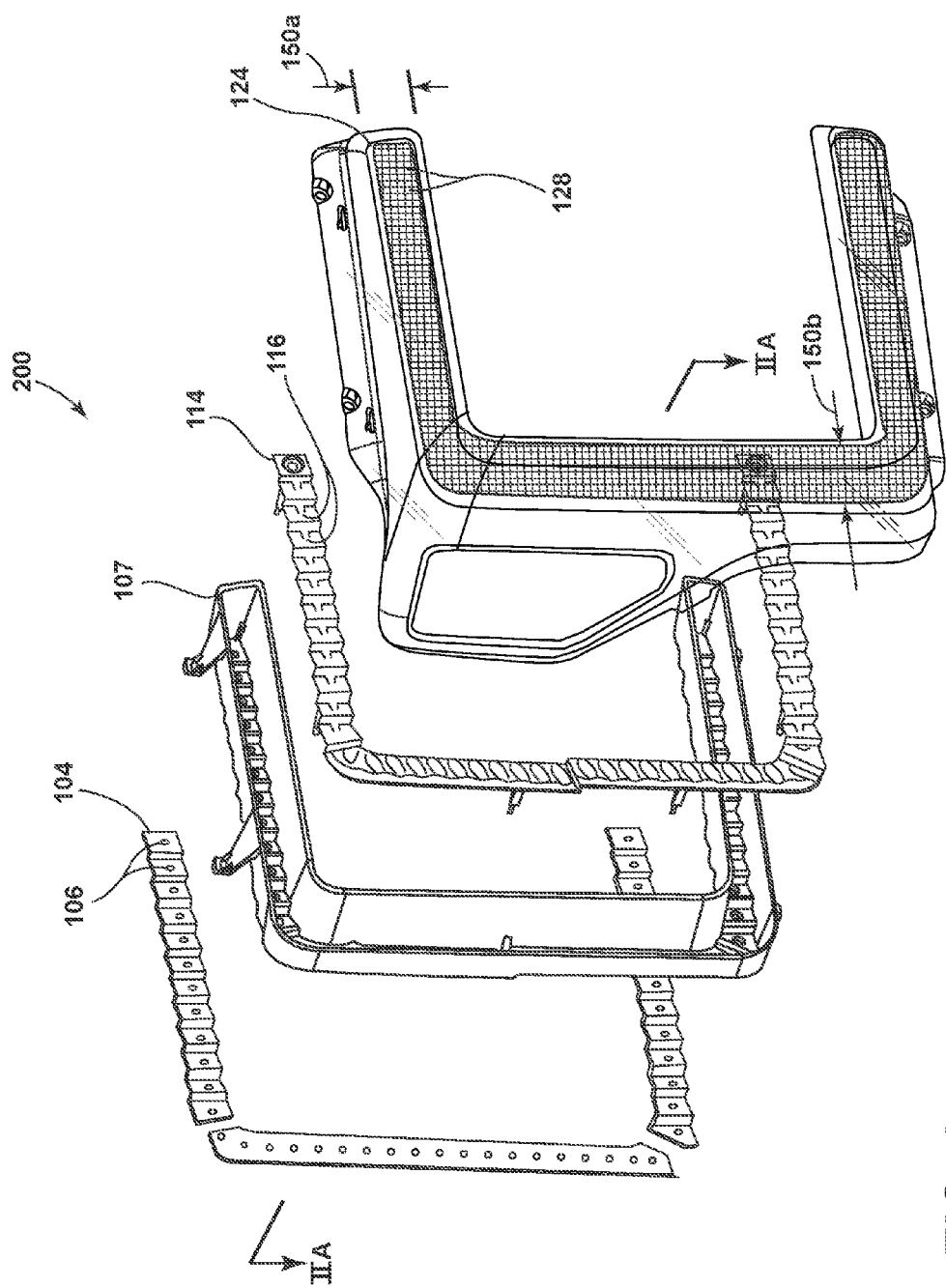
FIG. 2 is an exploded, perspective view of a vehicular signal assembly according to an embodiment.

For purposes of description herein, the terms "upper," "lower," "right," "left," "rear," "front," "vertical," "horizontal," and derivatives thereof shall relate to the invention as oriented in FIGS. 1 and 2. However, the invention may assume various alternative orientations, except where expressly specified to the contrary. Also, the specific devices illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

LED signal assemblies are employed today with great practical effect. In the automotive industry, many vehicles now utilize LED-based lighting assemblies. Much of the engineering work in connection with these vehicular lighting assemblies emphasizes a reduction in their overall dimensions. Further, these LED-based vehicular assemblies rely on multiple LED light sources, each inherently producing high light intensity with small beam angles. Accordingly, many LED-based lighting assemblies, including "low-profile" assemblies, produce "hot spots" of discrete light associated with each LED light source.

What has not been previously understood is how to configure and design LED-based vehicular lighting assemblies to produce highly uniform light for signal applications, including DRL applications requiring lighting patterns with high intensity and uniformity. Further, conventional LED-based, vehicular signal assemblies have been limited to linear or highly linear shapes with small widths.

Highly uniform light is particularly beneficial for many vehicular signal applications (e.g., brake lights, taillights, daytime running lights (DRLs), turn signals, reverse lamps, etc.). In certain vehicular signal applications, lighting assemblies that can produce output lighting patterns with a combination of high uniformity and intensity are particularly advantageous. For example, certain federal regulations mandate that DRLs produce a high intensity lighting pattern and customers frequently demand that such patterns are produced with high uniformity.

Referring to FIGS. 1, 1A and 1B, a vehicular signal assembly 100 is depicted according to an embodiment. The vehicular signal assembly 100 includes an inner chamber 10 defined by a substrate 4 that includes LED sources 6 and spaced apart, corresponding Fresnel lenses 16. In certain aspects, the Fresnel lenses 16 are coupled, or otherwise affixed, to a substrate 14. The signal assembly 100 further includes an outer chamber 20 defined by the Fresnel lenses 16 and an outer lens 24 having a width 50 and optical elements 28. Further, each LED source 6 emanates incident light 30a, 30b directly through the corresponding Fresnel lens 16 and optical elements 28 to produce an output light pattern 40 with a contrast ratio of 3:1 or less.

As shown in FIGS. 1, 1A and 1B, each of the LED sources 6 is coupled to a substrate 4 and oriented toward the Fresnel lenses 16 and the outer chamber 20. As shown in FIG. 1A, the Fresnel lenses 16 and substrate 14 are spaced apart by a depth 60a from the LED sources 6 and substrate 4. Each LED source 6 is configured within the chamber 10 such that its incident light 30a is directed through a corresponding Fresnel lens 16 (see FIGS. 1A and 1B). Consequently, a substantial portion of the incident light 30a from each LED source 6 impinges directly upon a corresponding Fresnel lens 16. In certain aspects of the signal assemblies 100, each LED source 6 is oriented substantially toward a corresponding Fresnel lens 16 within ±15°, ±10° or ±5° (along with any values between these ranges) of the center of the Fresnel lens 16 in the vertical and horizontal directions. In these aspects, a substantial portion of the incident light 30a from each LED source 6 also impinges directly upon a corresponding Fresnel lens 16.

Referring again to FIGS. 1, 1A and 1B, the inner chamber 10 of the vehicular signal assembly 100 can be configured with a substantially open construction in some embodiments. In particular, the inner chamber 10 can be configured such that any portion or portions 30c of the incident light 30a from a particular LED source 6 that does not impinge directly upon its corresponding Fresnel lens 16 can impinge on one or more adjacent Fresnel lenses 16. As such, light losses are minimized in the signal assembly 100 leading to higher intensity levels for a particular LED source 6 and, collectively, the signal assembly 100. Further, the inner chamber 10 can be configured such that the depth 60a (see FIGS. 1A and 1B) between the LED sources 6 and the Fresnel lenses 16 is controlled to ensure that the LED sources 6 reside within the focal length for the particular Fresnel lenses 16 selected for the signal assembly 100.

Various types of LED sources 6 (e.g., standard, single-die automotive LED units) may be employed in the vehicular signal assemblies 100. In some aspects of the signal assemblies 100 configured as DRL assemblies, LED sources 6 capable of collectively generating from about 250 lumens to about 5,000 lumens may be employed. In other aspects of vehicular signal assemblies 100 requiring lower intensity levels, LED sources 6 capable of generating from about 10 lumens to about 1,000 lumens may be employed. The substrate 4 containing the LED sources 6 may be fabricated from various metals, alloys, polymers and composite materials. In certain aspects of the signal assemblies 100, the materials selected for the substrate 4 are chosen to conduct heat away from the LED sources 6 and with relatively low coefficients of thermal expansion to ensure that heat from the LED sources 6 does not affect the orientation of the LED sources 6 relative to the Fresnel lenses 16. For example, substrate 4 can be fabricated from aluminum or aluminum alloys, and the sources 6 can be affixed to a flexible wiring board with the board being affixed to the substrate 4. In other embodiments, the substrate 4 comprises a polymeric or composite material serving as a printed wiring board for the sources 6.

Within vehicular signal assembly 100, multiple LED sources 6 can be employed within the inner chamber 10. In general, the number of LED sources 6 is set based on the overall size of the signal assembly 100, the particular output of the LED sources 6 selected for the assembly 100, the light intensity requirements of the application for the signal assembly 100, and/or desired light uniformity levels (e.g., a contrast ratio of about 3:1 or less). In certain aspects of the disclosure, the signal assembly 100 can be employed in a rear, above-trunk brake light application and configured in a substantially linear shape with about 2 to 30 LED sources 6. In another aspect, the signal assembly 100 is arranged in a C-shaped configuration with about 20 to 60 LED sources 6 for use in a DRL application. More generally, most aspects of the vehicular signal assembly 100 employ 2 to 100 LED sources 6.

Referring again to FIGS. 1, 1A and 1B, the Fresnel lenses 16 of the vehicular signal assembly 100 can be mounted to or within a substrate 14. A Fresnel lens 16 is configured in a spaced apart, corresponding relationship with each LED source 6. As such, the number of Fresnel lenses 16 substantially matches the number of LED sources 6. In certain embodiments of the signal assembly 100, the number of Fresnel lenses 16 may exceed the number of LED sources 6. In such embodiments, the additional Fresnel lenses 16 may be located at any ends within the outer chamber 20 to accommodate a portion 30c of incident light 30a from an LED source 6 that does not impinge upon its corresponding Fresnel lens 16.

The Fresnel lenses 16 employed within the vehicular signal assembly 100 can be configured with various focal lengths. For example, in some aspects of the vehicular signal assembly 100 employed in a DRL application, the Fresnel lenses 16 have a focal length from about 10 mm to about 20 mm. Preferably, the depth 60a in the inner chamber 10 is set based on the focal length of the Fresnel lenses 16 employed in the signal assembly 100. For example, the depth 60a can be set to be within about ±5 mm, ±4 mm, ±3 mm, ±2 mm, or ±1 mm of the focal length of the Fresnel lenses 16, or to an even closer match. In certain aspects of the vehicular assembly 100, the Fresnel lenses 16 are spherical Fresnel lenses configured into a sheet-like arrangement within the substrate 14. In some aspects of the vehicular signal assembly 100, the focal lengths chosen for the Fresnel lenses 16 are set based on depth-related, packaging limitations associated with the application for the signal assembly 100. In general, shorter depths 60a can improve light collection efficiency for the sources 6, and longer depths 60a can improve light output uniformity. Certain embodiments of the vehicular assembly 100 employ spherical Fresnel lenses 16 in a sheet-like arrangement with about 2 to 50 concentric ring-like segments, which appear as grooves in a cross-section of each Fresnel lens 16. Other embodiments employ 2, 5, 10, 15, 20, 25, 30, 35, 40, 45, 50, and any integer value between these ranges, of ring-like segments in each Fresnel lens 16. As the Fresnel lenses 16 are employed in signal assembly 100 to collimate the incident light 30a, these ring-like segments are located on the side or face of the Fresnel lenses 16 in the outer chamber 20 that faces the outer lens 24. In some aspects, the number of ring-like segments is selected to optimize the uniformity and intensity of the output light pattern 40. Higher densities of ring-like segments can improve light uniformity, but may lead to higher light losses and, hence, a reduction in light intensity. In contrast, lower densities of ring-like segments in the Fresnel lenses 16 can improve the intensity of the light pattern 40, but tend to reduce its uniformity.

In certain embodiments of the vehicular signal assembly 100, the Fresnel lenses 16 are fabricated from glass or other highly-translucent polymeric materials. The material selected for the Fresnel lenses 16 should be selected to minimize optical losses while being amenable to precision-manufacturing techniques suitable to produce the desired number of ring-like segments in each Fresnel lens 16. Further, the substrate 14 can be used to affix each of the lenses 16 and is at least highly translucent in the regions containing the lenses 16. In other aspects, the Fresnel lenses 16 are integral within the substrate 14. In addition, the Fresnel lenses 16 may be configured such that the lenses touch one another. In other aspects, each Fresnel lens 16 can be spaced relative to one another within or on substrate 14, and this spacing can correlate to the spacing set for the LED sources 6 on the substrate 4.

Referring again to FIGS. 1A and 1B, the incident light 30a produced by the LED sources 6 within the inner chamber 10 of the vehicular signal assembly 100 is substantially directional. The directional nature of the incident light 30a is advantageous for the signal assembly 100 as light losses to the sides of each source 6 are minimal. Further, LED sources 6 can be selected with a particular beam angle range given the geometry of the inner chamber 10, depth 60a and size of the Fresnel lenses 16. In certain aspects of the signal assemblies 100, the LED sources 6 are selected with a beam angle less than the angle formed between the source 6 and the outermost portion of each corresponding Fresnel lens 16. This ensures that most of the incident light 30a from the each source 6 impinges directly upon the corresponding Fresnel lens 16 with minimal light loss.

Still referring to FIGS. 1, 1A and 1B, the vehicular signal assembly 100 further includes an outer chamber 20 that is defined by the Fresnel lenses 16 and an outer lens 24 having a width 50 and optical elements 28. In the outer chamber 20, the Fresnel lenses 16 and substrate 14 are spaced apart by a depth 60b from the outer lens 24. Further, the incident light 30b is a collimated light pattern that results from the incident light 30a that has passed through the Fresnel lenses 16. As such, the incident light 30a is substantially collimated as it passes through the corresponding Fresnel lenses 16, and then emanates from the Fresnel lenses 16 within the chamber 20 as incident light 30b. The incident light 30b continues within the chamber 20 and impinges on the outer lens 24 and, more particularly, the optical elements 28. After the incident light 30b passes through the optical elements 28, it exits the outer chamber 20 as an output light pattern 40.

As noted earlier, the outer chamber 20 of the vehicular signal assembly 100 is defined by the substrate 14, Fresnel lenses 16 on or within the substrate 14, outer lens 24, and the optical elements 28 on or within the outer lens 24. As shown in FIGS. 1A & 1B, the substrate 14 is spaced apart from the outer lens 24 by a depth 60b. Further, the total depth 60 of the assembly 100 is the sum of the depth 60a of the inner chamber 10 and the depth 60b of the outer chamber 20. In one aspect of the vehicular signal assembly 100, the depth 60b is set between about 10 mm and about 40 mm. In some aspects of the signal assembly 100, the depth 60b in the outer chamber 20 is smaller than the depth 60a in the inner chamber 10. Other aspects of the signal assembly 100 employ an outer chamber 20 having a depth 60b that is at least two times smaller than the depth 60a in the inner chamber 10. More generally, reducing the depth 60b in the outer chamber 20 of the signal assembly 100 does not significantly degrade the intensity and/or the uniformity of the output light pattern 40. Conversely, reducing the depth 60b beneficially reduces the overall depth 60 of the signal assembly 100.

Referring again to FIGS. 1, 1A and 1B, the vehicular signal assembly 100 employs an outer lens 24 having a plurality of optical elements 28. In certain aspects, the optical elements 28 are shaped and dimensioned to spread the collimated light pattern of incident light 30b in vertical and horizontal directions. In particular, the incident light 30b, already with high uniformity, can be spread by the optical elements 28 such that the output light pattern 40 exhibits greater cone angles emanating from the outer lens 24. In other aspects of the signal assembly 100, various patterns of optical elements 28 can be positioned within or on the outer lens 24 with variously-sized optical elements 28 to shape the output light pattern 40 into non-circular and/or asymmetric shapes with one or more sections of high uniformity and intensity.

In certain aspects of the vehicular signal assembly 100, the optical elements 28 are also sized to produce a crystal-like appearance when the outer lens 24 is viewed under ambient light conditions and the LED sources 6 are not illuminated or otherwise activated. For example, optical elements 28 can be rectangular, square or similarly-shaped pixels with a width and length (or an effective width and length), each ranging from about 1 to about 5 mm and employed in the outer lens 24 to produce such an effect. Many individuals appreciate the aesthetics of such a crystal-like appearance in the signal assembly 100 that can result from the sizing of optical elements 28. In addition, the size reductions of the optical elements 28 to produce a crystal-like appearance can provide an added benefit of obscuring the other components of the assembly 100 (e.g., Fresnel lenses 16 and LED sources 6) from view by an individual positioned to look through the outer chamber 20 toward the inner chamber 10.

In certain embodiments of the vehicular signal assembly 100, the optical elements 28 within or on the outer lens 24 are fabricated from glass or other highly-translucent polymeric materials. The material selected for the optical elements 28 should be selected to minimize optical losses while being amenable to precision-manufacturing techniques suitable to produce the appropriate sizing and dimensions to efficiently spread the incident light 30a in various directions to form the output light pattern 40. Further, the outer lens 24 can be used to affix each of the optical elements 28 and is at least highly translucent in the regions containing the optical elements 28. In other aspects, the optical elements 28 are integral within the outer lens 24.

Referring again to FIGS. 1, 1A and 1B, the vehicular signal assembly 100 produces an output light pattern 40 that emanates from the outer lens 24 and optical elements 28. In certain aspects, the output light pattern 40 exhibits a contrast ratio of 3:1 or less. As used herein, the "contrast ratio" is the ratio between the maximum intensity within the output light pattern 40 and the minimum intensity within the output light pattern 40. Accordingly, the output light pattern 40 produced by a signal assembly 100 can exhibit a contrast ratio of 3:1 or less and smaller portions of the same output light pattern can exhibit a smaller contrast ratio. According to some aspects of the signal assembly 100, the output light pattern 40 exhibits a contrast ratio of about 3:1 or less, 2.75:1 or less, 2.5:1 or less, 2.25:1 or less, 2:1 or less, 1.75:1 or less, 1.5:1 or less, 1.25:1 or less, and all ratio values between the foregoing ratios. In certain aspects of the signal assembly 100, the assembly 100 is configured for operation as a vehicular DRL. In the United States, DRL-related regulations (see 49 C.F.R. § 571.108) require that the output light pattern 40 produces at least 500 candelas at the HV point and no more than 3000 candelas at any point within the pattern 40.

Referring again to FIG. 1, the vehicular signal assembly 100 can be configured with a width 50 for the outer lens 24 of an appreciable size. In some aspects, the width 50 can be set to at least 12 mm and up to about 125 mm for certain applications of the signal assembly 100. Depending on the size of the width 50 and light requirements for the output light pattern 40 (e.g., intensity and uniformity), multiple rows of LED sources 6 and spaced apart, corresponding Fresnel lenses 16 can be employed within the signal assembly 100. In certain aspects of the signal assembly 100, the width 50 is set to be between 12 mm to 100 mm, 12 mm to 75 mm, 12 mm to 50 mm, 12 mm to 25 mm, 25 mm and 100 mm, 25 mm and 75 mm, 25 mm to 50 mm, 50 mm to 100 mm, 50 mm to 75 mm, 75 mm to 100 mm, and all values of the width 50 between these ranges.

Still referring to FIG. 1, vehicular signal assembly 100, the inner and outer chambers 10, 20, and the outer lens 24 can take on various shapes and corner configurations. As shown in FIG. 1, the assembly 100 possesses a linear shape. Advantageously, the output light pattern 40 of the signal assembly 100 exhibits intensity and uniformity levels (e.g., contrast ratios of 3:1 or less) in each of the four corners of the outer lens 24 that exceed the capabilities of conventional off-axis, LED-based, vehicular signal assemblies that are configured with LED sources that direct incident light against internal reflector elements. Moreover, the signal assembly 100 and its outward geometric features (e.g., outer lens 24) can be configured in non-linear shapes, such as a C-shape, with more than four sharp corners, with each corner exhibiting a portion of the light output pattern 40 with a contrast ratio of 3:1 or less.

Figure 2A:
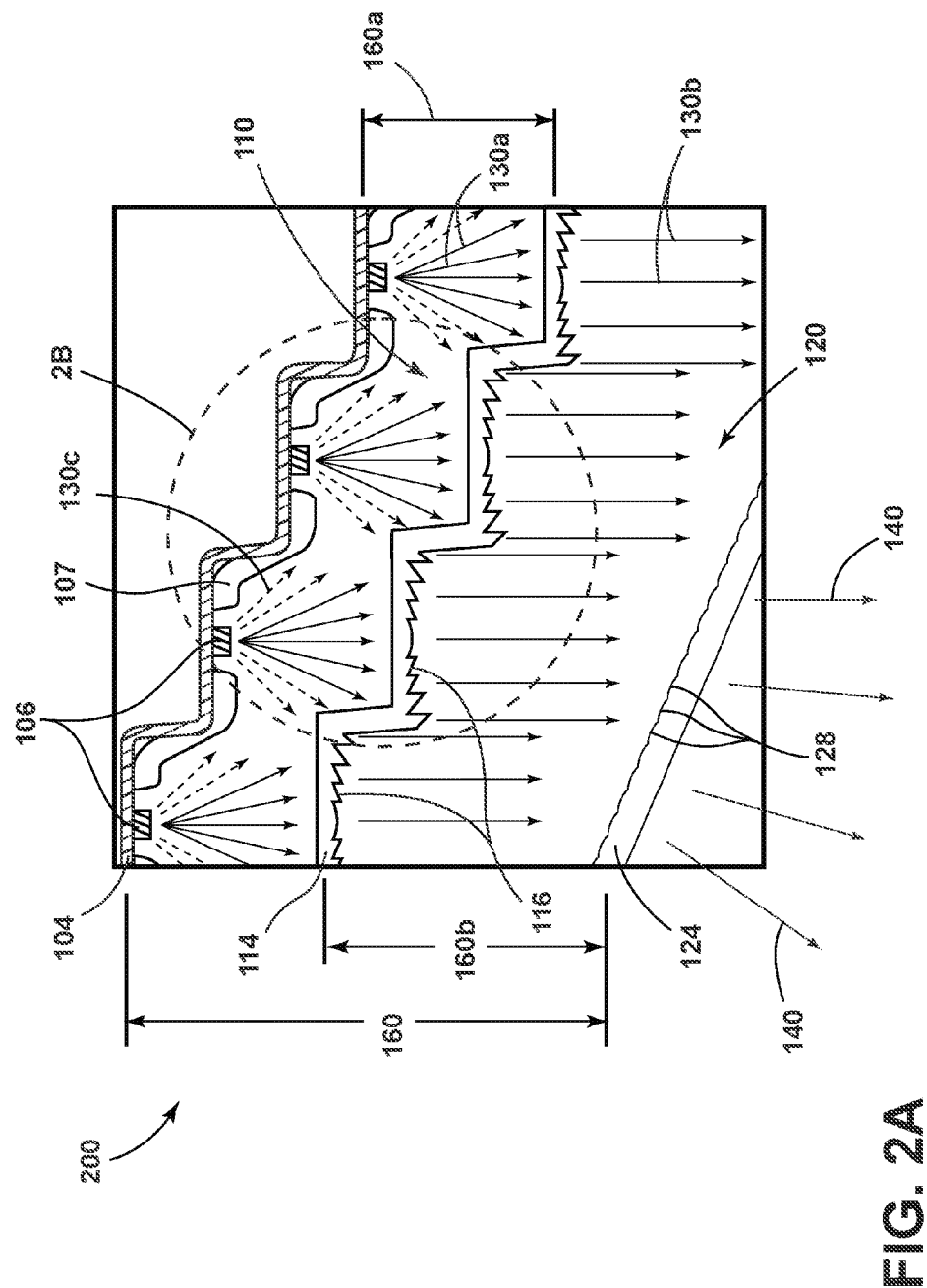
FIG. 2A is a top-down, cross-sectional view of the signal assembly depicted in FIG. 2.
Figure 2B:
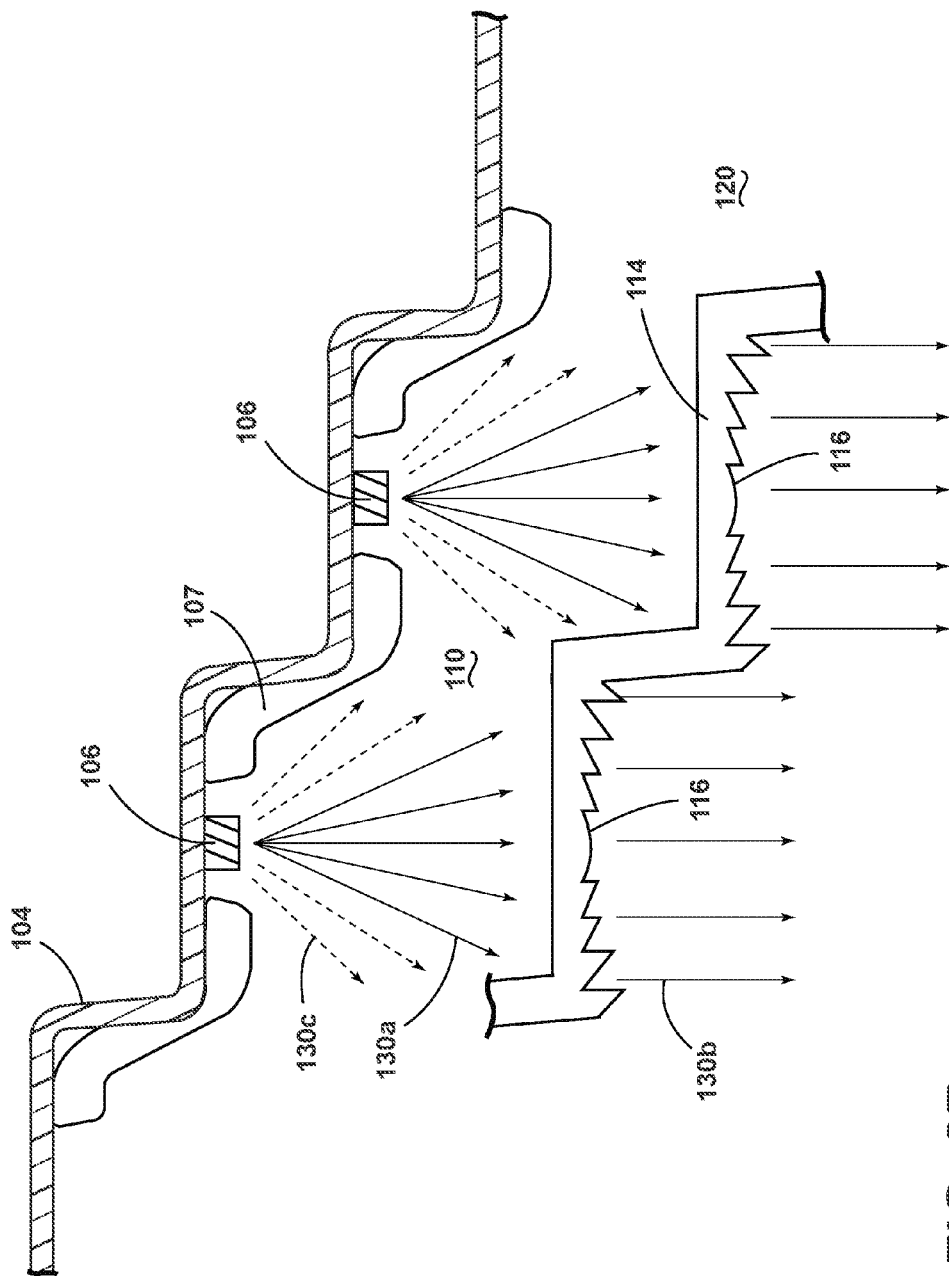
FIG. 2B is an enlarged view of Fresnel lenses in the signal assembly depicted in FIG. 2A.

Referring to FIGS. 2, 2A and 2B, a vehicular signal assembly 200 is depicted according to an exemplary embodiment of the disclosure. Unless otherwise noted, the elements associated with the signal assembly 200 with like names but different element numbers have the same or similar constructions and functions (e.g., inner chamber 10 and inner chamber 110 associated with respective vehicular signal assemblies 100 and 200). The vehicular signal assembly 200 includes an inner chamber 110 defined by a substrate 104 that includes LED sources 106. In certain aspects of the assembly 200, the inner chamber 110 also includes an LED source body 107, coupled to the substrate 104 and configured with orifices to allow light from the sources 106 to pass into chamber 110. The inner chamber 110 of the signal assembly 200 also includes Fresnel lenses 116 spaced apart from, and configured to correspond to, the LED sources 106. In certain aspects, the Fresnel lenses 116 are coupled, or otherwise affixed, to a substrate 114. The vehicular signal assembly 200 further includes an outer chamber 120 defined by the Fresnel lenses 116 and an outer lens 124 configured in a C-shape arrangement. Further, the outer lens 124 has widths 150a, 150b that correspond to horizontal and vertical sections of the lens 124, and further includes optical elements 128. Each LED source 106 of the signal assembly 200 emanates incident light 130a, 130b directly through the corresponding Fresnel lens 116 and optical elements 128 to produce an output light pattern 140 with a contrast ratio of 3:1 or less suitable for use in a DRL application.

As shown in FIGS. 2, 2A and 2B, each of the LED sources 106 is coupled to a substrate 104 and oriented toward the Fresnel lenses 116 (through the LED source body 107 if present) and the outer chamber 120. As shown in FIG. 2A, the Fresnel lenses 116 and substrate 114 are spaced apart by a depth 160a from the LED sources 106 and substrate 104. Each LED source 106 is configured within the chamber 110 such that its incident light 130a is directed through a corresponding Fresnel lens 116 (see FIG. 2A). Consequently, a substantial portion of the incident light 130a from each LED source 106 impinges directly upon a corresponding Fresnel lens 116. In certain aspects of the signal assemblies 200, each LED source 106 is oriented substantially toward a corresponding Fresnel lens 116 within ±15°, ±10° or ±5° (along with any values between these ranges) of the center of the Fresnel lens 116 in the vertical and horizontal directions. In these aspects, a substantial portion of the incident light 130a from each LED source 106 also impinges directly upon a corresponding Fresnel lens 116.

Referring again to FIGS. 2, 2A and 2B, the inner chamber 110 of the signal assembly 200 can be configured with a substantially open construction in some embodiments. In particular, the inner chamber 110 can be configured such that any portion or portions 130c of the incident light 130a from a particular LED source 106 that does not impinge directly upon its corresponding Fresnel lens 116 can impinge on one or more adjacent Fresnel lenses 116. As such, light losses are minimized in the signal assembly 200 leading to higher intensity levels for a particular LED source 106 and, collectively, the signal assembly 200. Further, the inner chamber 110 can be configured such that the depth 160a (see FIG. 2A) between the LED sources 106 and the Fresnel lenses 116 is controlled to ensure that the LED sources 106 reside within the focal length for the particular Fresnel lenses 116 selected for the vehicular signal assembly 200.

Within signal assembly 200, multiple LED sources 106 can be employed within the inner chamber 110. In general, the number of LED sources 106 is set based on the overall size of the signal assembly 200, the particular output of the LED sources 106 selected for the assembly 200, the light intensity requirements of the application for the signal assembly 200 (e.g., as set by DRL-related federal regulations), and/or desired light uniformity levels (e.g., a contrast ratio of about 3:1 or less). As depicted in FIG. 2, the signal assembly 200 is configured in a C-shape for a DRL-related application with about 45 LED sources 106, each source 106 producing about 10 to 12 lumens. Similarly configured signal assemblies 200 can be configured with 10 to 60 LED sources 106. With efficiencies between 20 to 40%, these signal assemblies 200 can then produce output light pattern 140 with at least 100 lumens. For example, the signal assembly 200 depicted in FIG. 2 can operate with about 25% efficiency and possess 45 LED sources 106, each producing 10 lumens, such that the output light pattern 140 has about 113 lumens (i.e., 45×10 lumens×0.25).

Referring again to FIGS. 2, 2A and 2B, the Fresnel lenses 116 of the vehicular signal assembly 200 can be mounted to a substrate 114. A Fresnel lens 116 is configured in a spaced apart relationship with each LED source 106. As such, the number of Fresnel lenses 116 substantially matches the number of LED sources 106. In certain embodiments of the signal assembly 200, the number of Fresnel lenses 116 may exceed the number of LED sources 106. In such embodiments, the additional Fresnel lenses 116 may be located at any ends within the outer chamber 120 (e.g., at the ends of a C-shaped outer lens 124) to accommodate a portion 130c of incident light 130a from an LED source 106 that does not impinge upon its corresponding Fresnel lens 116.

The Fresnel lenses 116 employed within the vehicular signal assembly 200 can be configured with various focal lengths. For example, in some aspects of the vehicular signal assembly 200 employed in a DRL application, such as depicted in FIGS. 2, 2A and 2B, the Fresnel lenses 116 have a focal length from about 10 to about 20 mm. In certain preferred aspects, such as depicted in FIGS. 2, 2A and 2B, the focal length is set to about 13 to 16 mm. Preferably, the depth 160a in the inner chamber 110 is set based on the focal length of the Fresnel lenses 116 employed in the signal assembly 200. For example, the depth 160a can be set to be within about ±5 mm, ±4 mm, ±3 mm, ±2 mm, or ±1 mm of the focal length of the Fresnel lenses 116, or to an even closer match. In certain aspects of the vehicular assembly 200, the Fresnel lenses 116 are spherical Fresnel lenses configured into a sheet-like arrangement within the substrate 114. In some aspects of the vehicular signal assembly 200, the focal lengths chosen for the Fresnel lenses 116 are set based on depth-related, packaging limitations associated with the DRL-related application for the signal assembly 200. Certain embodiments of the vehicular assembly 200 employ spherical Fresnel lenses 116 in a sheet-like arrangement with about 2 to 50 concentric ring-like segments, which appear as grooves in a cross-section of each lens 116. Other embodiments employ 2, 5, 10, 15, 20, 25, 30, 35, 40, 45, 50, and any integer value between these ranges, of ring-like segments in each Fresnel lens 116. As the Fresnel lenses 116 are employed in vehicular signal assembly 200 to collimate the incident light 130a, these ring-like segments are located on the side or face of the Fresnel lenses 116 in the outer chamber 120 that faces the outer lens 124. In some aspects, the number of ring-like segments is selected to optimize the uniformity and intensity of the output light pattern 140. Higher densities of ring-like segments can improve light uniformity, but may lead to higher light losses and, hence, a reduction in light intensity of the output light pattern 140. In contrast, lower densities of ring-like segments in the Fresnel lenses 116 can improve the intensity of the light pattern 140 but also tend to reduce its uniformity.

Referring again to FIGS. 2A and 2B, the incident light 130a produced by the LED sources 106 within the inner chamber 110 of the vehicular signal assembly 200 is substantially directional. The directional nature of the incident light 130a is advantageous for the signal assembly 200 as light losses to the sides of each source 106 are minimal. LED sources 106 can be selected with a particular beam angle range given the geometry of the inner chamber 110, depth 160a and size of the Fresnel lenses 116. In certain aspects of the signal assemblies 200, the LED sources 106 are selected with a beam angle less than the angle formed between the source 106 and the outermost portion of each corresponding Fresnel lens 116. This ensures that most of the incident light 130a from the each source 106 impinges directly upon the corresponding Fresnel lens 116 with minimal light loss.

Still referring to FIGS. 2, 2A and 2B, the signal assembly 200 further includes an outer chamber 120 that is defined by the Fresnel lenses 116 and an outer lens 124 having widths 150a, 150b, and optical elements 128. In the outer chamber 120, the Fresnel lenses 116 and substrate 114 are spaced apart by a depth 160b from the outer lens 124. Further, the incident light 130b is a collimated light pattern that results from the incident light 130a that has passed through the Fresnel lenses 116. As such, the incident light 130a is substantially collimated as it passes through the corresponding Fresnel lenses 116, and then emanates from the Fresnel lenses 116 within the chamber 120 as incident light 130b. The incident light 130b continues within the chamber 120 and impinges on the outer lens 124 and, more particularly, the optical elements 128. After the incident light 130b passes through the optical elements 128, it exits the outer chamber 120 as an output light pattern 140.

As discussed earlier, the outer chamber 120 of the vehicular signal assembly 200 is defined by the substrate 114, Fresnel lenses 116 on or within the substrate 114, outer lens 124, and the optical elements 128 on or within the outer lens 124. As shown in FIGS. 2A & 2B, the substrate 114 is spaced apart from the outer lens 124 by a depth 160b. In addition, the total depth 160 of the assembly 200 is the sum of the depth 160a of the inner chamber 110 and the depth 160b of the outer chamber 120. In one aspect of the signal assembly 200, the depth 160b is set between about 10 mm and about 40 mm. In a preferred aspect, the depth 160b is set between about 25 and 30 mm. In some aspects of the signal assembly 200, the depth 160b in the outer chamber 120 is smaller than the depth 160a in the inner chamber 110. Other aspects of the signal assembly 200 employ an outer chamber 120 having a depth 160b that is at least two times smaller than the depth 160a in the inner chamber 110. More generally, reducing the depth 160b in the outer chamber 120 of the signal assembly 200 does not significantly degrade the intensity and/or the uniformity of the output light pattern 140 and yet beneficially reduces the overall depth 160 of the signal assembly 200.

Referring again to FIGS. 2, 2A and 2B, the signal assembly 200 employs an outer lens 124 having a plurality of optical elements 128. In certain aspects, the optical elements 128 are shaped and dimensioned to spread the collimated light pattern of incident light 130b in vertical and horizontal directions. In particular, the incident light 130b, already with high uniformity, can be spread uniformly by the optical elements 128 to a greater cone angle emanating from the outer lens 124 in the form of the output light pattern 140.

In certain aspects of the signal assembly 200, the optical elements 128 are also sized to produce a crystal-like appearance when the outer lens 124 is viewed under ambient light conditions and the LED sources 106 are not illuminated or otherwise activated. For example, optical elements 128 can be rectangular, square or similarly-shaped pixels with a width and length (or an effective width and length), each ranging from about 1 to about 5 mm and employed in the outer lens 124 to produce such an effect. In a preferred rectangular aspect, optical elements 128 are configured in a 2 mm×4 mm arrangement. Many individuals appreciate the aesthetics of such a crystal-like appearance in the signal assembly 200 that can result from the sizing of optical elements 128. In addition, the size reductions of the optical elements 128 to produce a crystal-like appearance can provide an added benefit of obscuring the other components of the assembly 200 (e.g., Fresnel lenses 116 and LED sources 106) from view by an individual positioned to look through the outer chamber 120.

Referring again to FIGS. 2, 2A and 2B, the vehicular signal assembly 200 produces an output light pattern 140 that emanates from the outer lens 124 and optical elements 128. In certain aspects, the output light pattern 140 exhibits a contrast ratio of 3:1 or less. According to some aspects of the signal assembly 200, the output light pattern 140 exhibits a contrast ratio of about 3:1 or less, 2.75:1 or less, 2.5:1 or less, 2.25:1 or less, 2:1 or less, 1.75:1 or less, 1.5:1 or less, 1.25:1 or less, and all ratio values between the foregoing ratios. Further, as noted earlier, DRL-related regulations (see 49 C.F.R. § 571.108) require that the output light pattern 140 produces at least 500 candelas at the HV point and no more than 3000 candelas at any point within the pattern 140.

Referring again to FIG. 2, the vehicular signal assembly 200 can be configured with widths 150a, 150b for the outer lens 124 that are appreciable in size. In some aspects, the widths 150a, 150b can be set to at least 12 mm and up to about 125 mm for certain applications of the signal assembly 200. Depending on the size of the widths 150a, 150b and light requirements for the output light pattern 140 (e.g., intensity and uniformity), multiple rows of LED sources 106 and Fresnel lenses 116 can be employed within the signal assembly 200. In certain aspects of the signal assembly 200, the widths 150a, 150b are set to be between 12 mm and 100 mm, 12 mm and 75 mm, 12 mm and 50 mm, 12 mm and 25 mm, 25 mm and 100 mm, 25 mm and 75 mm, 25 mm to 50 mm, 50 mm to 100 mm, 50 mm to 75 mm, 75 mm to 100 mm, and all values of the widths 150a, 150b between these ranges.

Certain recitations contained herein refer to a component being "configured" or "adapted to" function in a particular way. In this respect, such a component is "configured" or "adapted to" embody a particular property, or function in a particular manner, where such recitations are structural recitations as opposed to recitations of intended use. More specifically, the references herein to the manner in which a component is "configured" or "adapted to" denotes an existing physical condition of the component and, as such, is to be taken as a definite recitation of the structural characteristics of the component.

Variations and modifications can be made to the aforementioned structure without departing from the concepts of the present invention. For example, various color filters can be added within the inner chamber 10, 110 or outer chamber 20, 120 of the vehicular signal assemblies 100, 200 to impart a color or colors to the output light pattern 40, 140. As another example related to the signal assemblies 100, 200, specular or non-specular reflecting materials can be employed on the LED source body 107 (signal assembly 200) and/or within the outer chamber 20, 120 at its ends normal to the outer lens 24, 124 to encourage internal reflection of the incident light 30a, 30b, 130a, 130b and thus avoid light loss. Further, such concepts are intended to be covered by the following claims unless these claims by their language expressly state otherwise.

What is claimed is:

1. A vehicular signal assembly, comprising:
    an inner chamber defined by a substrate and spaced apart, corresponding Fresnel lenses; and
    an outer chamber defined by the Fresnel lenses and an outer lens,
    the chambers non-linearly shaped and comprise at least one right angle having a sharp corner, and
    the substrate comprises a plurality of LED sources emanating light through the chambers into a light pattern with a contrast ratio of 3:1 or less.

2. The assembly according to claim 1, wherein the light pattern is characterized by a contrast ratio of 1.5:1 or less.

3. The assembly according to claim 1, wherein the outer lens comprises a plurality of optical elements that spread the light pattern into a non-circular or an asymmetric shape.

4. The assembly according to claim 1, wherein each LED source is positioned to be within a focal length of the corresponding Fresnel lens.

5. The assembly according to claim 1, wherein the corresponding Fresnel lenses are configured within a single Fresnel lens substrate spaced apart from the substrate comprising the LED sources.

6. The assembly according to claim 1, wherein each LED source comprises a beam angle less than an angle formed between each LED source and an outermost portion of the corresponding Fresnel lens.

7. A vehicular signal assembly, comprising:
    an inner chamber defined by a substrate and spaced apart, corresponding Fresnel lenses; and
    an outer chamber defined by the Fresnel lenses and an outer lens,
    the chambers having a substantially open construction and comprise at least one right angle having a sharp corner, and
    the substrate comprises a plurality of LED sources emanating light through the chambers into a light pattern, each LED source emanating light through the corresponding lens and at least one adjacent lens.

8. The assembly according to claim 7, wherein the light pattern is characterized by a contrast ratio of 1.5:1 or less.

9. The assembly according to claim 7, wherein the outer lens comprises a plurality of optical elements that spread the light in into a non-circular or an asymmetric shape.

10. The assembly according to claim 7, wherein each LED source is positioned to be within a focal length of the corresponding Fresnel lens.

11. The assembly according to claim 7, wherein the corresponding Fresnel lenses are configured within a single Fresnel lens substrate spaced apart from the substrate comprising the LED sources.

12. The assembly according to claim 7, wherein each LED source comprises a beam angle less than an angle formed between each LED source and an outermost portion of the corresponding Fresnel lens.

13. A vehicular signal assembly, comprising:
    an inner chamber defined by a substrate and spaced apart, corresponding Fresnel lenses; and
    an outer chamber defined by the Fresnel lenses and an outer lens,
    the chambers non-linearly shaped with a substantially open construction and comprise at least one right angle having a sharp corner, and
    the substrate comprises a plurality of LED sources emanating light through the chambers into a light pattern, each LED source emanating light through the corresponding lens and at least one adjacent lens.

14. The assembly according to claim 13, wherein the outer lens comprises a plurality of optical elements that spread the light in into a non-circular or an asymmetric shape.

15. The assembly according to claim 13, wherein each LED source is positioned to be within a focal length of the corresponding Fresnel lens.

16. The assembly according to claim 13, wherein the corresponding Fresnel lenses are configured within a single Fresnel lens substrate spaced apart from the substrate comprising the LED sources.

17. The assembly according to claim 13, wherein each LED source comprises a beam angle less than an angle formed between each LED source and an outermost portion of the corresponding Fresnel lens.

\* \* \* \* \*